F. F. TAYLOR.
DEVICE FOR USE IN INDUSTRIAL LIFE INSURANCE SYSTEMS.
APPLICATION FILED JULY 3, 1916.

1,226,277.

Patented May 15, 1917.
4 SHEETS—SHEET 1.

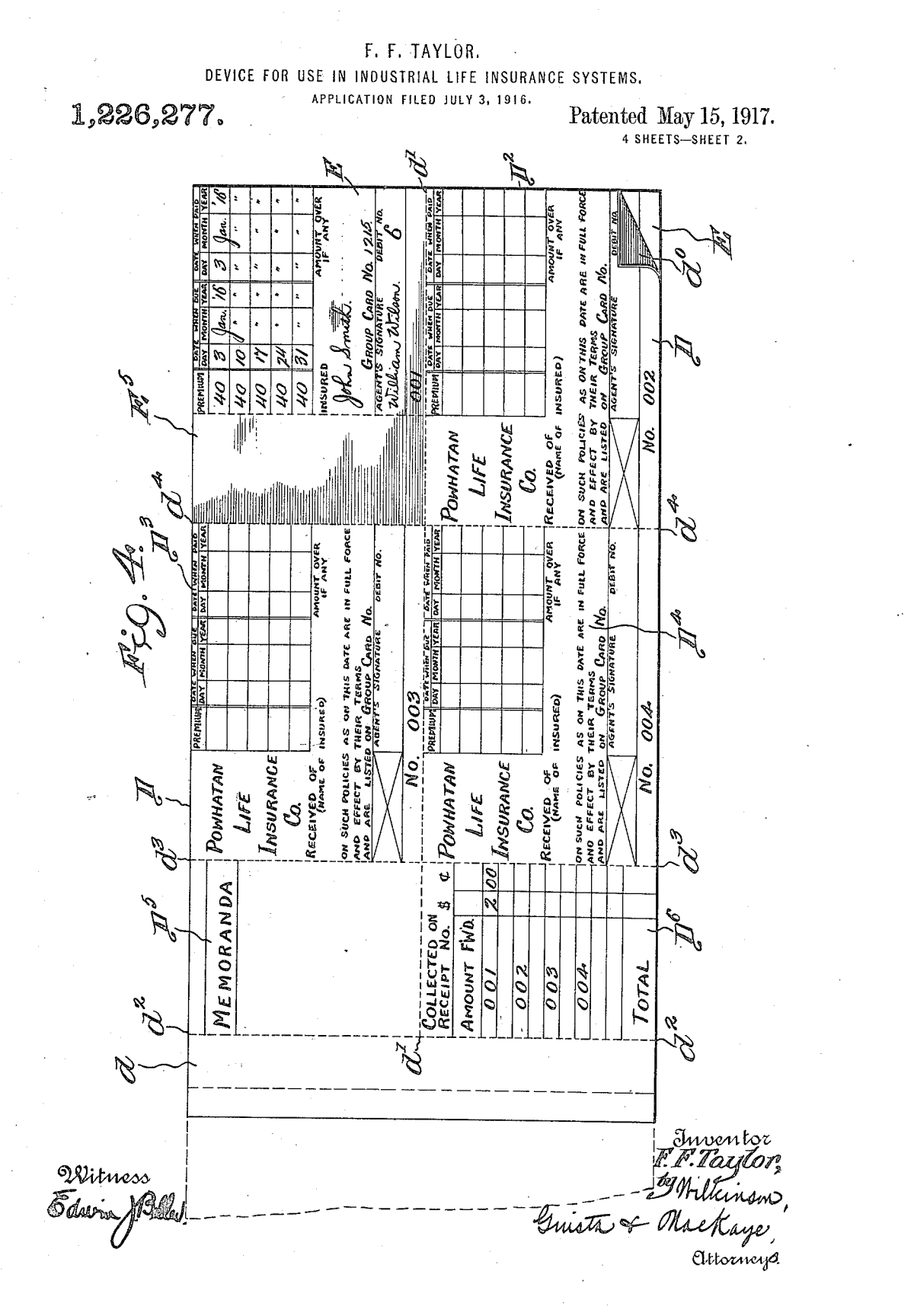

F. F. TAYLOR.
DEVICE FOR USE IN INDUSTRIAL LIFE INSURANCE SYSTEMS.
APPLICATION FILED JULY 3, 1916.

1,226,277.

Patented May 15, 1917.
4 SHEETS—SHEET 2.

F. F. TAYLOR.
DEVICE FOR USE IN INDUSTRIAL LIFE INSURANCE SYSTEMS.
APPLICATION FILED JULY 3, 1916.

1,226,277.

Patented May 15, 1917.
4 SHEETS—SHEET 3.

F. F. TAYLOR.
DEVICE FOR USE IN INDUSTRIAL LIFE INSURANCE SYSTEMS.
APPLICATION FILED JULY 3, 1916.

1,226,277.

Patented May 15, 1917.

| 1916. ADDRESS. 42 H St. NW. | POLICY NUMBERS | NAME John Smith Mary Smith John Smith Jr. | AGE | DATE | KIND OF POLICY | WEEKLY PREMIUM .25 .10 .05 | FAMILY GROUP NUMBER 1215. |
|---|---|---|---|---|---|---|---|
| JANUARY 3 | JANUARY 10 | JANUARY 17 | JANUARY 24 | | | | |
| FEBRUARY 7 | FEBRUARY 14 | FEBRUARY 21 | FEBRUARY 28 | | | | |
| MARCH 6 | MARCH 13 | MARCH 20 | MARCH 27 | | | | |
| APRIL 3 | APRIL 10 | APRIL 17 | APRIL 24 | | | | |
| MAY 1 | MAY 8 | MAY 15 | MAY 22 | MAY 29 | | | |
| JUNE 5 | JUNE 12 | JUNE 19 | JUNE 26 | | | | |

Fig. 5.

Witness
Edwin J Beller.

Inventor
F. F. Taylor.
by Wilkinson, Ginsta & MacKaye,
Attorneys.

UNITED STATES PATENT OFFICE.

FREDERICK F. TAYLOR, OF PELHAM, NEW YORK, ASSIGNOR TO PROVIDENT SYSTEMS CORPORATION, OF NEW YORK, N. Y., A CORPORATION OF NEW YORK.

DEVICE FOR USE IN INDUSTRIAL-LIFE-INSURANCE SYSTEMS.

1,226,277. Specification of Letters Patent. Patented May 15, 1917.

Application filed July 3, 1916. Serial No. 107,462.

*To all whom it may concern:*

Be it known that I, FREDERICK F. TAYLOR, a citizen of the United States, residing at Pelham, in the county of Westchester and State of New York, have invented certain new and useful Improvements in Devices for Use in Industrial-Life-Insurance Systems; and I do hereby declare the following to be a full, clear, and exact description of the invention, such as will enable others skilled in the art to which it appertains to make and use the same.

My invention relates to an improved means for simplifying the keeping of accounts and checking up errors therein; and it is specially applicable to those lines of business where there are a large number of small accounts requiring frequent and periodical collections, and in which the employment of a large number of collectors, without previous accounting experience, is unavoidable.

With such a large number of such employees scattered throughout the United States, and often remote from immediate supervision, it is eminently desirable, from every standpoint, to simplify the system of making and accounting for such collections, and to provide means whereby the errors or peculations of the numerous collectors may be promptly and readily noted, and protection given both to the parties paying the small sums referred to, and to the company for whom such payments are intended.

My invention is particularly designed to simplify the making of collections, to lessen the errors and losses incident thereto, to provide means for quickly noting any discrepancies or irregularities in the accounts of collectors or others; and is especially intended to reduce the cost of administration in transacting the business of life insurance companies.

My said invention is more especially adapted for use in a system of accounting in what is known as industrial or weekly premium life insurance, in relation to the work in branch offices, and to agents in the field, and to the returns to the main or home office.

In such systems there is ordinarily one home office, one or more branch offices in each of the larger cities, and a greater or less number of agents in the field, with, of course, the necessary officials, clerical force, etc.

The weekly premiums to be collected are generally each for small amounts, and, quite often are assessed in varying proportions against the different members of a family, and are payable in a lump sum weekly, or monthly as the case may be, by any member of the family.

In such cases the total weekly premium to be paid by the family, in itself ordinarily a very small sum, has to be accounted for as divided up into still smaller sums assessed against the individual members of the family; and these collections, made by the numerous collectors or agents in the field, have each to be accounted for to the payer, and to the branch office, and by the latter to the home office.

With the system or systems now in vogue in the life insurance business, many mistakes are inevitable in the proper accounting for the moneys so paid in, there are many opportunities for peculation on the part of the collectors, and it is often extremely difficult to detect errors in the accounts.

To remedy these evils, to lessen the time and labor required in making, accounting for, and checking up the collections so made, and to materially lessen the bookkeeping and other clerical work incident to the systems now in vogue in such business, this invention is especially intended.

My invention will be more clearly understood after reference to the accompanying drawings, in which the same reference symbols indicate similar parts throughout the several views:

Figure 1 shows one page of the "family group designation book," parts being broken away.

Fig. 2 shows one of the "family group premium cards."

Fig. 3 shows a sample page of the "agent's route book."

Fig. 4 shows the top, or original sheet of the "agent's entry and receipt book," with one receipt torn out.

Fig. 4ᵃ shows the lower or "copy" sheet of the "agent's entry and receipt book"; and Fig. 5 shows one side of a loose leaf sheet to be kept in the branch office debit book.

A, Fig. 1, shows one page of and illustrates the family group designation book. Each page of this book contains serially numbered ruled spaces; and each family is assigned a "group number" which that particular family will retain permanently, or until removal to another district, city or town. A new policy issued on the life of a member of a family to whom a number has already been assigned will be included in the originally numbered group. New policies issued in families, or on single lives not already insured, will be assigned original group numbers.

This page also is ruled to show the name of the family as at $a$, and at $a'$ the column headed "Debit No." indicates on which agent's route this family is located, the following columns $a^2$ are provided in case the family moves or is transferred to another agent's route.

B, Fig. 2, shows one of the weekly family group premium cards. These cards will be numbered as at $b$, preferably at the top of the card, to correspond with the group number of the family in the family group designation book, which, in this instance, is assumed to be No. 1215. Each family will be provided with one of these cards, which will ordinarily be kept in the same envelop with the policies taken out by that family; and this card will contain a summary and description of the policies held in that particular family, which data would be conveniently placed in vertical columns ruled horizontally and headed respectively, Policy number, Name of insured, Weekly premium, Amount of policy, and Age of insured. The total weekly premium payable for that particular family is indicated at the place marked $b'$ near the bottom of said card.

In Fig. 2 I have shown the group card filled out with the three policies of the John Smith family, with weekly premiums of 25¢, 10¢ and 5¢, aggregating a premium of forty cents a week, the policies being numbered 1,000,001, 02, and 03, respectively.

C, Fig. 3, represents a sample page of the "agent's route book," on which are entered, in the column $c$, preferably in the order to be visited on his route, the group numbers of the various families to be visited by him. In the next column $c'$, the names of the families indicated; in the next column $c^2$ the number of the house; in the next column $c^3$ street number; in the next column $c^4$ number of the policies in the family indicated; in column $c^5$ the total weekly premium payable by that family; and in columns $c^6$, the months and days of the month through which the weekly premiums have been paid.

Thus, in Fig. 3, I have shown that the group No. 1215 corresponds with the John Smith family dwelling at 42 H street, N.W., which was three policies aggregating 40¢ per week of premiums payable, and the X mark indicates that the premiums have been paid through the week beginning Jan. 31, 1916.

For the sake of clearness in the drawings, I have shown this sheet C broken away, but there will be 52 of these columns $c^6$ corresponding to the 52 weekly collections to be made during the 12 months of the year.

The column $c^7$ is provided for use in making special memoranda as to the family indicated on the same line.

The agent should indicate by check or other suitable mark in one of the columns $c^6$ the date through which the policies were paid by the last payment of the premium.

He should also indicate on this book in the column marked $c^7$, or elsewhere, any failure to visit or to collect from any particular family.

The "agent's entry and receipt book" comprises a series of upper and lower sheets D and E alternately disposed, the upper sheet D, shown in Fig. 4, being intended to receive the autographic entries made by the agent, and the lower sheet E, shown in Fig. 4ª, being intended to receive the carbon copy of the entries made by the agent on the upper sheet.

In practice each book is preferably composed of twenty-five sets of sheets, or fifty sheets in all, with four detachable receipts to each sheet, furnishing one hundred original receipts, and a carbon copy of each receipt, with other data hereinafter referred to.

The upper sheet D shown in Fig. 4, is provided with a binding margin $d$ for binding in book form and with a series of horizontal perforations $d'$—$d'$ and with vertical perforations $d^2$—$d^2$, $d^3$—$d^3$ and $d^4$—$d^4$ so that the sheet may be conveniently separated into six segments, four of these segments constituting the original receipts to be handed to the person paying the premium, and the other two segments being stub segments which are retained in the book.

I have shown three of such original receipts $D^2$, $D^3$ and $D^4$, the receipt which would be indicated by $D'$ having been torn off and delivered to the person paying the premium. Each of the four receipts will have entered thereon in the proper place by the agent, the number of the family group card, for instance #1215, and the name of the family, the debit number (#6), the amount of weekly premiums due, for instance 40¢, the Mondays in the month on which these premiums are due, the month and year and day when the premiums were paid, and the agent (William Wilson) will sign the same and tear off the receipt, and give it to the person paying the same.

When he fills out any receipt, he will enter in the corresponding line on the stub segment D⁶ the amount paid in, which, for instance was $2, and in the stub segment D⁵, he will enter any memoranda that may have bearing upon the payment referred to.

The top sheet is preferably provided with a backing of carbon or other copying material, so that the risk of fraud in making false copies when detached carbon sheets are used is in a large measure avoided.

The lower sheet E shown in Fig. 4ᵃ is substantially similar to the upper sheet and is adapted to make a true copy of all of the autographic material impressed on the top sheet D. For convenience in assembling the carbon copies of the receipts in the branch office debit book, shown in Fig. 5, the carbon copies of these receipts are preferably made of shorter length than the original receipts handed to the parties paying the premiums, and therefore, I provide the three vertical perforated lines e—e, e'—e', and e²—e² and the horizontal perforated line e³—e³ so that the lower sheet may be torn into six segments, leaving the stub still bound in the book.

The segments E', E², E³ and E⁴, include the carbon copies of the four receipts filled out by the agent on the upper sheet. The two segments E⁵ and E⁶ may be detached and thrown away or used for any purpose not necessarily connected with the system; and the stub E⁷ which is left in the book, will contain, on its upper portion, a copy of the memoranda made out by the agent on the upper stub segment D⁵; and the lower portion of the stub E⁷ will bear thereon the total amount brought forward from the preceding pages, and the amount stated in each receipt on this particular sheet.

It will be noted that the printed matter on the left side of each receipt on the upper sheet D is so arranged that the agent will be obliged to fill in his signature and the original entries made by him on that sheet, immediately above the receipt segments on the sheet beneath, so that all of the original entries on the upper sheet will be included in a limited space on the sheet below, thus the receipt will be shown in condensed form on the sheet below and will occupy less space when transferred to the branch office debit book, as will be hereinafter described.

In practice, the agent will fill out each receipt on the sheet D, and also the stub on said sheet, and will hand the four original receipts to the respective parties paying the premiums, and will also fill out the stubs on the upper sheet, incidentally making a carbon copy of the receipts and of the stubs on the lower sheet.

If for inability to make change, or for any other reason, the agent collects more than is due, the excess is indicated at the space marked "Amount over, if any" in each original receipt, and is transferred by the carbon to the copy of the receipt below. On the stub, the line marked "Amount fwd." is intended for the agent to enter therein the balance from previous collections made by him, and noted in this book since the last accounting with the branch office.

The entries being properly made, at the required time, the agent brings the book to the branch office for settlement. The book should then contain all the stubs of the sheets D, and any original receipts attached thereto that have not been used. It should also contain all of the sheets E intact, but with all the autographic entries made by the agent copied thereon.

The part D⁶ of the stub of the last-used upper sheet in the book will show the total amount collected by that agent since the last accounting, the amount brought forward being entered on the stub followed by the amounts collected as indicated by the receipts on that particular sheet.

When the book is brought in for settlement, the agent turns in the book with the total amount of money due by him indicated on the last stub D⁶; the cashier checks this up to note if correct, and this stub when initialed by the cashier, constitutes the agent's receipt for the amount turned in.

The stub D⁵ containing the memoranda referred to may be retained for future reference by the agent, or by the company, or left in the book.

Having thus disposed of the various segments of the upper sheet D, the various carbon copies of the receipts E' to E⁴ are torn out of the lower sheet E in the branch office and these several receipts are pasted in the proper spaces in the branch office debit book, one leaf F of which is shown in Fig. 5.

Referring now to Fig. 5, the branch office debit book is composed of a series of loose leaves F, ruled preferably on both sides into a number of panels corresponding to the 52 weekly days of payment in the year. I have shown in Fig. 5 the loose leaf ruled on one side for the first six months in the year. The sheet would be similarly ruled on its back for the other six months. These sheets would be headed with the group number as 1215, names and address of the insured family, and a description of each policy contained in the family group, the same as that shown in the family group premium card B of Fig. 2. The carbon copy of the receipt torn from sheet E will be removed by the cashier, or any other person assigned to this duty, and pasted in the proper blank space on the leaf F of Fig. 5. This space shows the day of the week, and month that the cash collected covers the premiums paid by the family. This date initially would appear in the blank space, and when this date on the blank space is covered by affixing the receipt, the date would still appear as the date of last payment on the face of the receipt.

Thus in Figs. 4 and 5, the family group No. 1215 is shown as having paid on January 3, 1916, all the premiums for the mouth of January 1916; and a glance at the sheet E, having the copy of the receipt pasted on it, will be sufficient to establish the fact that that particular family group has paid all its premiums up to January 31, 1916.

Thus when the carbon copy of the receipt is pasted on the loose leaf F at the proper place, it can be noted at a glance whether that particular family group has paid up to date or is in arrears on its premiums.

A memorandum of the family groups in arrears can be quickly made, and it will be a simple matter to ascertain the cause of such non-payment, whether from inability to pay, transference to another district, failure of the agent to turn in the money received, or other cause of such non-payment.

These loose leaves F will also show at a glance whether that family has been paying its premiums regularly or in advance; and also when policies that have lapsed from failure to pay the premiums are to be reported by the manager to the home office for official cancellation.

Such information as furnished by these sheets as to transference, lapsing of policies, etc., may be readily indicated on sheets A and C, shown in Figs. 1 and 3, and thus a complete record may be readily and easily kept up to date.

It will be seen that, in Fig. 4, I show an arrangement whereby duplicate copies of four separate receipts are made, the originals of which receipts are distributed to the parties paying the money, and the carbon copies of the receipts are subsequently removed and applied to the proper family group sheets F; leaving duplicate memoranda of the amounts borne by each receipt and the total amount paid in by the four parties to whom the receipts were given, as also duplicate memoranda of any matters of interest in connection with the four receipts just mentioned.

By this arrangement, the branch office is provided with a similar copy for its file; each person paying in the money is provided with a receipt of such payment, and a carbon copy of each receipt is available for pasting on the family group loose leaf F, so that any clerk can tell at a glance how the account of any particular family stands whether they have paid up or not, etc.

When the agent turns in carbon copies without the originals, he will have to make good for the totals shown thereon, so that the only way to cheat the employer would be to destroy the records, and in such event the company would have recourse to the agent's bondsman.

The various persons insured will, of course, be instructed not to pay any premiums without the official receipts, and if the family has the original receipt and the carbon copy has not been turned in, the agent can be called to account.

By this system there are very few loopholes left for errors on the part of the field agents, and any such errors or any peculation on the part of the agents can be at once detected.

As it will be seen, I have described a system adapted especially for use by life insurance companies, which does not require any great degree of education or intelligence to carry out, and which will greatly simplify the expense of bookkeeping and other clerical work, incident to the systems now generally in use, and which will automatically indicate any negligence, inefficiency, or dishonesty on the part of the agent making the collections, or any abnormal details on the part of the insured in making the prescribed payments.

While I have shown in Fig. 4 the sheet D provided with four receipts, and I prefer such form, as such sheets may be bound in a book of convenient size for the agent to carry in his pocket, it will be obvious that the number of the receipts and the number of divisions of the stub may be increased or decreased without departing from the spirit of my invention.

While I have shown this device as especially adapted for the payment of weekly premiums, it will be obvious that it might be applied to accounting for the payment of monthly premiums if desired. It is especially applicable, however, to accounting for the payment of weekly premiums for life insurance since these are generally paid in small amounts, and the collections are made by a horde of agents scattered over wide areas of territory, and whose actions it is difficult to always keep under proper supervision or control.

Having thus described my invention, what I claim and desire to secure by Letters-Patent of the United States is:

1. A device for use in accounting comprising a plurality of superposed sheets secured together at one edge and provided with a detachable stub provided with numbers, and a series of separate receipts detachably connected to said stub, and to each other, said receipts being numbered to correspond with numbers on said stub, and the stub being ruled so that the amount indicated by each of said receipts may be transferred to said stub, with means for transferring any memoranda written on the top sheet to the sheet beneath, in combination with a loose leaf provided with a series of spaces each dated, respectively, to correspond with the dates of required payments of premiums, said spaces being adapted, respectively, to receive one copy of each of said receipts when detached from its sheet, and to visually indicate the last date to which said premiums have been paid, substantially as described.

2. A device for use in accounting comprising a book composed of a series of sets of superposed sheets secured together at one edge and provided with a detachable stub provided with numbers, and with a series of separate receipts detachably connected to each stub, and to each other, said receipts being numbered to correspond with numbers on the corresponding stub, and the stub being ruled so that the amount indicated by each of said receipts may be transferred to said stub, with means for transferring any memoranda written on the top sheet to the sheet beneath, in combination with a series of loose leaves, each provided with a series of spaces each dated, respectively, to correspond with the dates of required payments of premiums, said spaces being adapted, respectively, to receive one copy of each of said receipts when detached from its sheet, and to visually indicate the last date to which said premiums have been paid, substantially as described.

3. A device for use in accounting in the business of life insurance comprising a pair of superposed sheets secured together at one edge and provided with two detachable stub members, and with a series of separate receipts detachably connected to said stub members, and to each other, one of each pair of stub members being provided with numbers, and said receipts being numbered to correspond with numbers on said stub members, and the stub member being ruled so that the amount indicated by each of said receipts may be transferred to said stub member, and the other stub member being left blank for memoranda, the upper sheet having its back coated with copying material, whereby any memoranda written on the top sheet will be transferred to the sheet beneath, in combination with a loose leaf provided with a series of spaces each dated, respectively, to correspond with the dates of required payments of premium, said spaces being adapted, respectively, to receive one copy of each of said receipts when detached from its sheet, and to visually indicate the last date to which said premiums have been paid, substantially as described.

4. A device for use in accounting comprising an upper and a lower sheet, with means for transferring any memoranda written on said upper sheet to said lower sheet, the upper sheet being provided with a plurality of receipt forms, and with lines of perforations whereby said sheet may be readily separated into a stub and a plurality of receipt segments, said stub being provided with numbers, and said receipt segments being numbered to correspond with numbers on said stub and said receipts having a limited portion only of their face ruled to receive autographic memoranda, and the lower sheet being correspondingly ruled to make a complete compact copy of the autographic memoranda on the upper sheet, and provided with lines of perforations whereby the copies of said receipts may be detached complete in form but in smaller segments than the receipt segments in the upper sheet, substantially as described.

5. A device for use in accounting comprising a book composed of a series of upper and lower sheets, with means for transferring any memoranda written on said upper sheet to said lower sheet, each upper sheet being provided with a plurality of receipt forms, and with lines of perforations whereby said sheet may be readily separated into a stub and a plurality of receipt segments, said stub being provided with numbers, and said receipt segments being numbered to correspond with numbers on said stub and said receipts having a limited portion only of their face ruled to receive autographic memoranda, and the lower sheet being correspondingly ruled to make a complete compact copy of the autographic memoranda on the upper sheet, and provided with lines of perforations whereby the copies of said receipts may be detached complete in form but in smaller segments than the receipt segments in the upper sheet, substantially as described.

6. A device for use in accounting comprising a book composed of a series of upper and lower sheets, with means for transferring any memoranda written on said upper sheet to said lower sheet, each upper sheet being provided with a plurality of receipt forms, and with lines of perforations whereby said sheet may be readily separated into a stub and a plurality of receipt segments, said stub being provided with numbers, and said receipt segments being numbered to correspond with numbers on said stub and said receipts having a limited portion only of their face ruled to receive autographic memoranda, and the lower sheet being correspondingly ruled to make a complete compact copy of the autographic memoranda on the upper sheet, and provided with lines of perforations whereby the copies of said receipts may be detached complete in form but in smaller segments than the receipt segments in the upper sheet, and a debit book provided with a series of loose leaves, each leaf being provided with a series of spaces dated, respectively, to correspond with the dates of required payments, and each space being adapted to receive one of the compact receipt segments when detached from said lower sheet, and to form therewith a visual record of the payments made, substantially as described.

7. A device for use in accounting comprising an upper and a lower sheet, the upper sheet being provided with a layer of carbon or other copying material on its back for transferring any memoranda written on said upper sheet to said lower sheet, the upper sheet being provided with a plurality of receipt forms, and with lines of perforations whereby said sheet may be readily separated into a stub and a plurality of receipt segments, said stub being provided with numbers, and said receipt segments being numbered to correspond with numbers on said stub and said receipts having a limited portion only of their face ruled to receive autographic memoranda, and the lower sheet being correspondingly ruled to make a complete compact copy of the autographic memoranda on the upper sheet, and provided with lines of perforations whereby the copies of said receipts may be detached complete in form but in smaller segments than the receipt segments in the upper sheet, substantially as described.

8. A device for use in accounting comprising a book composed of a series of upper and lower sheets, the upper sheet being provided with a layer of carbon or other copying material on its back for transferring any memoranda written on said upper sheet to said lower sheet, each upper sheet being provided with a plurality of receipt forms, and with lines of perforations whereby said sheet may be readily separated into a stub and a plurality of receipt segments, said stub being provided with numbers, and said receipt segments being numbered to correspond with numbers on said stub and said receipts having a limited portion only of their face ruled to receive autographic memoranda, and the lower sheet being correspondingly ruled to make a complete compact copy of the autographic memoranda on the upper sheet, and provided with lines of perforations whereby the copies of said receipts may be detached complete in form but in smaller segments than the receipt segments in the upper sheet, and a debit book provided with a series of loose leaves, each leaf being provided with a series of spaces dated, respectively, to correspond with the dates of required payments, and each space being adapted to receive one of the compact receipt segments when detached from said lower sheet, and to form therewith a visual record of the payments made, substantially as described.

In testimony whereof, I affix my signature.

FREDERICK F. TAYLOR.

Copies of this patent may be obtained for five cents each, by addressing the "Commissioner of Patents, Washington, D. C."